United States Patent
Takagishi et al.

(10) Patent No.: US 6,990,049 B2
(45) Date of Patent: Jan. 24, 2006

(54) OPTICAL INFORMATION RECORDING MEDIUM, METHOD FOR RECORDING/ REPRODUCING THE SAME, AND OPTICAL PICKUP

(75) Inventors: Yoshikazu Takagishi, Fujioka (JP); Atsuo Shimizu, Saitama (JP); Ryuichi Sunagawa, Takasaki (JP); Keiichi Ida, Gunma (JP); Mitsuo Sekiguchi, Gunma (JP); Isao Matsuda, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 310 days.

(21) Appl. No.: 10/203,761

(22) PCT Filed: Feb. 14, 2001

(86) PCT No.: PCT/JP01/01022

§ 371 (c)(1),
(2), (4) Date: Aug. 13, 2002

(87) PCT Pub. No.: WO01/59773

PCT Pub. Date: Aug. 16, 2001

(65) Prior Publication Data

US 2003/0048734 A1 Mar. 13, 2003

(30) Foreign Application Priority Data

Feb. 14, 2000 (JP) .................................. 2000-035288

(51) Int. Cl.
*G11B 7/00* (2006.01)

(52) U.S. Cl. .................................. 369/47.28; 369/275.4

(58) Field of Classification Search ............. 369/275.1, 369/275.2, 275.3, 275.4, 47.28, 53.43, 53.44
See application file for complete search history.

(56) References Cited

U.S. PATENT DOCUMENTS 5,517,485 A    5/1996  Nishiuchi et al.
6,754,166 B2 * 6/2004  Arioka et al. ............ 369/275.1

FOREIGN PATENT DOCUMENTS

EP    0 880 131   11/1998
JP    8-194971    7/1996

* cited by examiner

*Primary Examiner*—Nabil Hindi
(74) *Attorney, Agent, or Firm*—Finnegan, Henderson, Farabow, Garrett & Dunner, L.L.P.

(57) ABSTRACT

An optical information recording medium, recording and reproducing method and device for same, and an optical pickup, which enables high-density recording and high-speed recording. Recording or reproduction is performed to or from the optical information recording medium having a track pitch Tp of 1.0 $\mu m \leq Tp \leq 1.2$ $\mu m$, using laser light having a wavelength $\lambda$ of 770 $nm \leq \lambda \leq 830$ nm, and a spot diameter Sd of 1.1 $\mu m \leq Sd \leq 1.3$ $\mu m$.

5 Claims, 8 Drawing Sheets

DIAGRAM OF INFORMATION RECODING AND REPRODUCTION MECHANISM

OVERALL COMPOSITION OF THE OPTICAL IMFORMATION RECORDING MEDIUM

DIAGRAM OF INFORMATION RECODING AND REPRODUCTION MECHANISM

PRINCIPAL ENLARGED VIEW OF OPTICAL INFORMATION RECORDING MEDIUM

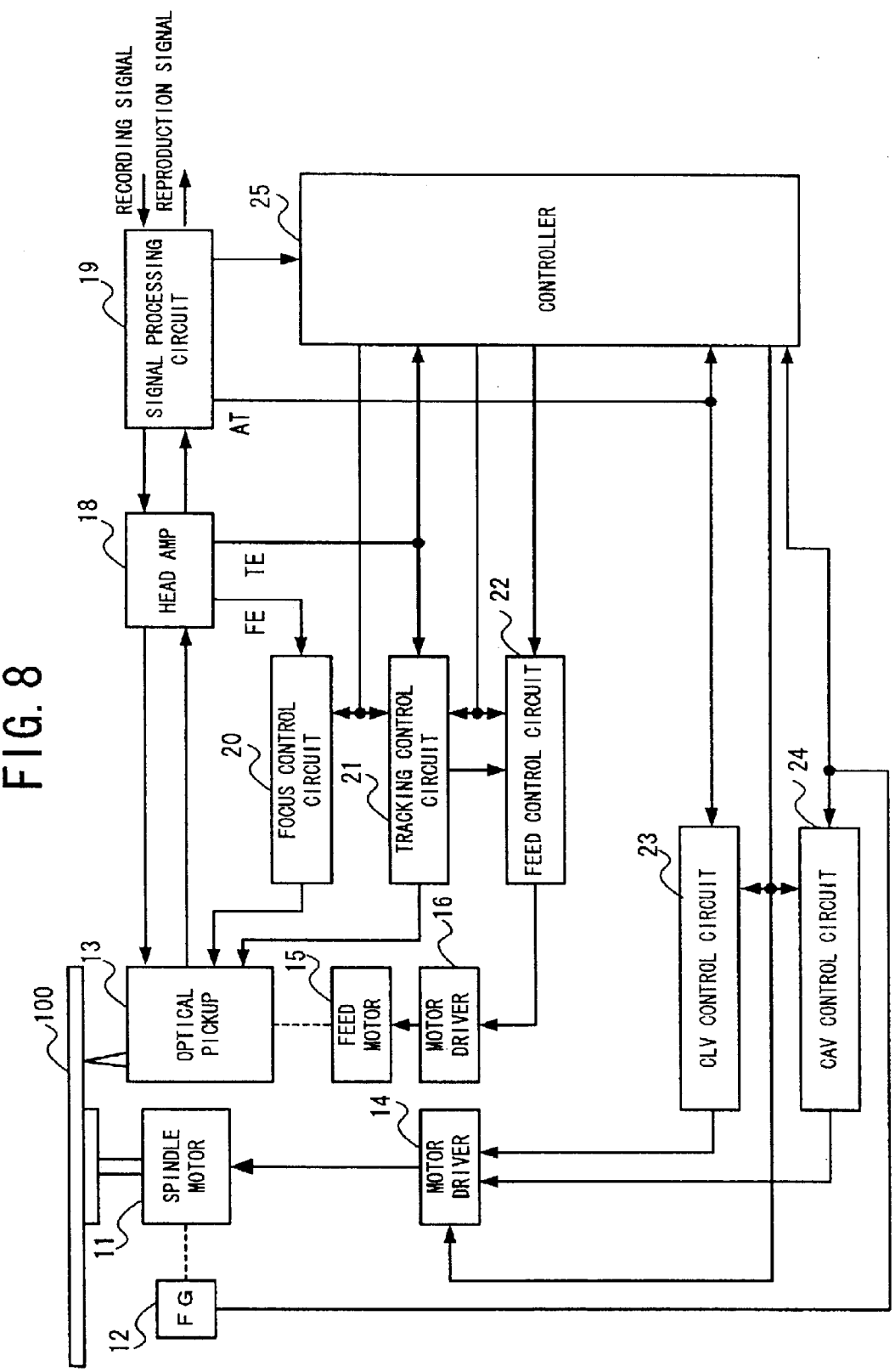

OPTICAL INFORMATION RECORDING MEDIUM, METHOD FOR RECORDING/REPRODUCING THE SAME, AND OPTICAL PICKUP

TECHNICAL FIELD

The present invention relates to a recording and reproducing method and device for an once-type optical information recording medium such as a compact disc-recordable (CD-R), and an optical pickup, and more particularly, to a recording and reproducing method for an optical information recording medium, and an optical pickup, whereby high-speed recording is possible, whilst also achieving high-density recording having an increased recording capacity.

BACKGROUND ART

A CD-R is generally known as a write-once type optical information recording medium which is reproduced by a compact disc (CD) drive or compact disc read only memory (CD-ROM) drive.

An optical information medium such as a CD-R has a basic structure wherein a recording layer consisting of an organic pigment film formed on a translucent substrate provided with spiral-shaped pre-grooves, a reflective layer consisting of metallic film is formed thereon, on top of which a protective layer consisting of ultraviolet-setting resin is formed, and recording is performed by irradiating a laser beam onto the recording layer from the translucent substrate side, thereby destroying the pigment in the recording layer in a localized fashion.

Due to its merits of CD compatibility and a lower cost price per bit than paper, the market for such optical information recording media is expanding rapidly, and recording devices, and media corresponding to same, which are capable of writing at recording speeds over 10 times conventional speeds, are being supplied in the market in response to demands for high-speed processing capability.

Moreover, the market is also demanding increased recording capacity in response to the year on year increases in data processing volumes, and capacity of the order of 1.3 GB (Gigabytes) is considered necessary for data volumes for image processing, and the like.

Moreover, in cases where, in order to ensure approximately double the present recording capacity without changing the external diameter of a conventional write-once type optical information recording medium, pit recording is performed using a laser beam of 780 nm wavelength, 0.45–0.50 NA (Numerical Aperture), and approximately 1.6 µm spot diameter in a current CD-ROM/-R/-RW drive, or the like, then problems of the following kind arise.

Namely, if it is attempted simply to reduce the interval of the track pitch, then during reproduction, the leakage of signals from adjacent tracks, known as "cross talk", will increase, meaning that a clean signal cannot be obtained, and moreover, as a consequence of this, the fluctuation in the bit signal during reproduction, known as "jitter", will also increase.

Furthermore, if it is attempted to increase the density of the recorded pits in the linear velocity direction, then a phenomenon known as thermal interference will occur, wherein the heat energy generated during pit formation will affect the recording state of the subsequent pit, and moreover, by shortening the length of the previously recorded pit and the interval from same to the next pit, the position of the subsequently written pit is more liable to be displaced, and consequently, jitter increases. This applies similarly in the case of high-speed recording.

DISCLOSURE OF THE INVENTION

It is an object of the present invention to provide a recording and reproducing method for an optical information recording medium, and an optical pickup, whereby high-density recording and high-speed recording can be achieved.

In the present invention, recording or reproduction is performed to or from an optical information recording medium having a track pitch Tp of $1.0\ \mu m \leq Tp \leq 1.2\ \mu m$, using laser light having a wavelength $\lambda$ of $770\ nm \leq \lambda \leq 830\ nm$, and a spot diameter Sd of $1.1\ \mu m \leq Sd\ 1.3\ \mu m$.

Here, since the track pitch Tp is determined by the interval between adjacent pre-grooves 201, information is recorded within these pre-grooves, and therefore this track pitch Tp corresponds to the recording pitch in the radial direction of the optical information recording medium.

Moreover, the linear velocity Lv indicates the relative velocity of the laser light performing recording or reproduction of information to or from the optical information recording medium, with respect to the optical information recording medium in the direction of the tracks.

In other words, during recording or reproducing information to or from the optical information recording medium of this type, the rotational speed of the optical information recording medium is controlled in such a manner that the velocity of the laser light performing recording or reproduction to or from the optical information recording medium in the direction of the pre-grooves of the optical information recording medium, in other words, the direction of the tracks thereof, is uniform, and this relative velocity of the laser light with respect to the aforementioned optical information recording medium which is controlled to a uniform velocity is the aforementioned linear velocity Lv.

In the present invention, pre-grooves are formed on the optical information recording medium in such a manner that the aforementioned track pitch Tp is in the range of $1.0\ \mu m \leq Tp \leq 1.2\ \mu m$, and during information recording, the aforementioned linear velocity Lv is controlled to a range of $0.77\ m/s \leq Lv \leq 0.97\ m/s$.

Here, the irradiation of light onto the recording layer via the aforementioned translucent substrate is performed by means of laser light having a wavelength $\lambda$ of $770\ nm \leq \lambda \leq 830\ nm$, a skew angle $\delta$ of $-0.6° \leq \delta \leq 0.6°$, a numerical aperture of $0.5 \leq NA \leq 0.55$, and a spot diameter Sd of $1.1\ \mu m \leq Sd \leq 1.3\ \mu m$.

In this case, if the track pitch Tp is less than $1.0\ \mu m$, then the jitter will rise above 35 ns, due to the effects of cross-talk, and hence stable recording and reproducing characteristics cannot be obtained. A jitter of less than 35 ns is the value specified by the CD-R Standards in Orange Book ver. 2.0.

Moreover, if the track pitch Tp exceeds $1.2\ \mu m$, then if it is attempted to achieve a capacity of the order of 1.3 GB, the linear velocity Lv will decline to 0.77 m/s or lower, and in this case, stable recording and reproducing characteristics will not be possible, due to thermal interference.

BRIEF DESCRIPTION OF THE DRAWINGS

FIG. 8 is a block diagram showing the overall composition of an optical information recording device for recording and reproducing information to and from the optical information recording medium shown in FIG. 1.

BEST MODE FOR CARRYING OUT THE INVENTION

Below, embodiments of the optical information recording medium relating to the present invention are described in detail with reference to the accompanying drawings.

Figure 1:
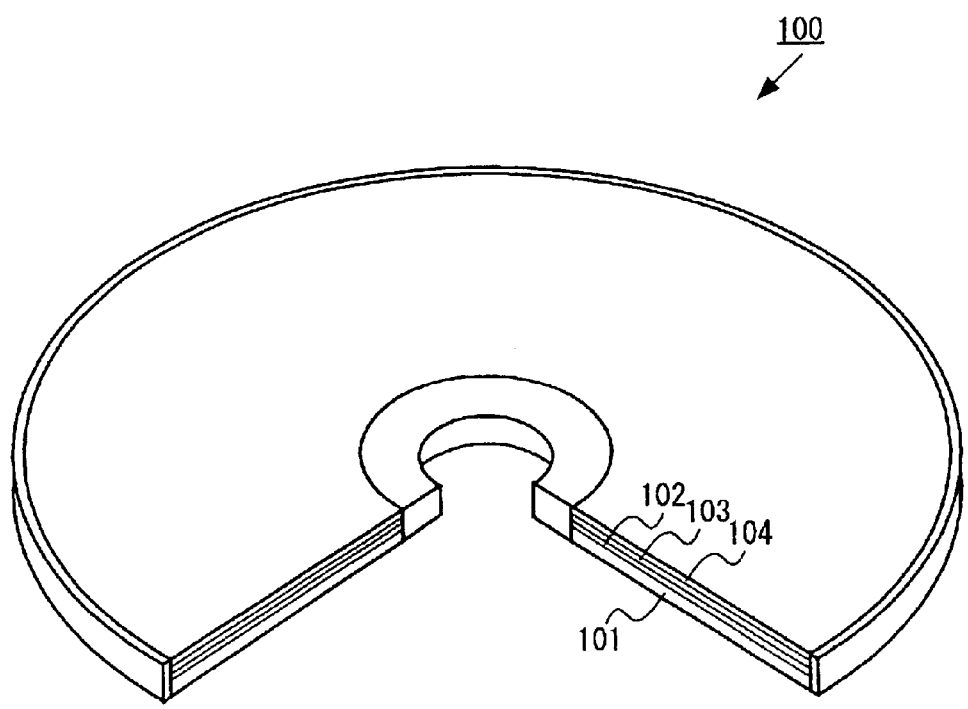
FIG. 1 is a partial cutaway oblique view showing the general composition of an optical information recording medium relating to the present invention.
Figure 2:
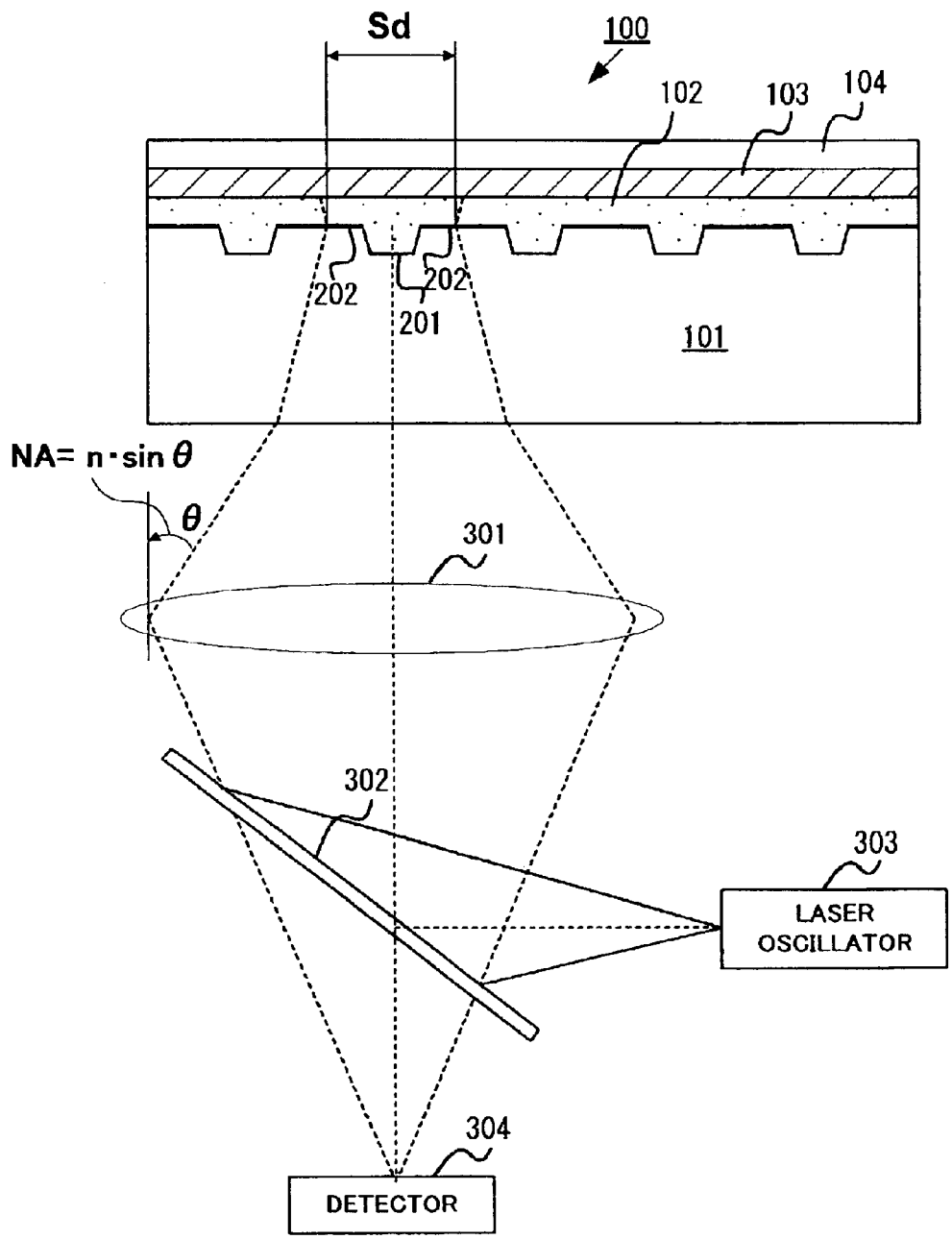
FIG. 2 is a diagram showing an overview of an information recording and reproducing mechanism with respect to the optical information recording medium shown in FIG. 1.
Figure 3:
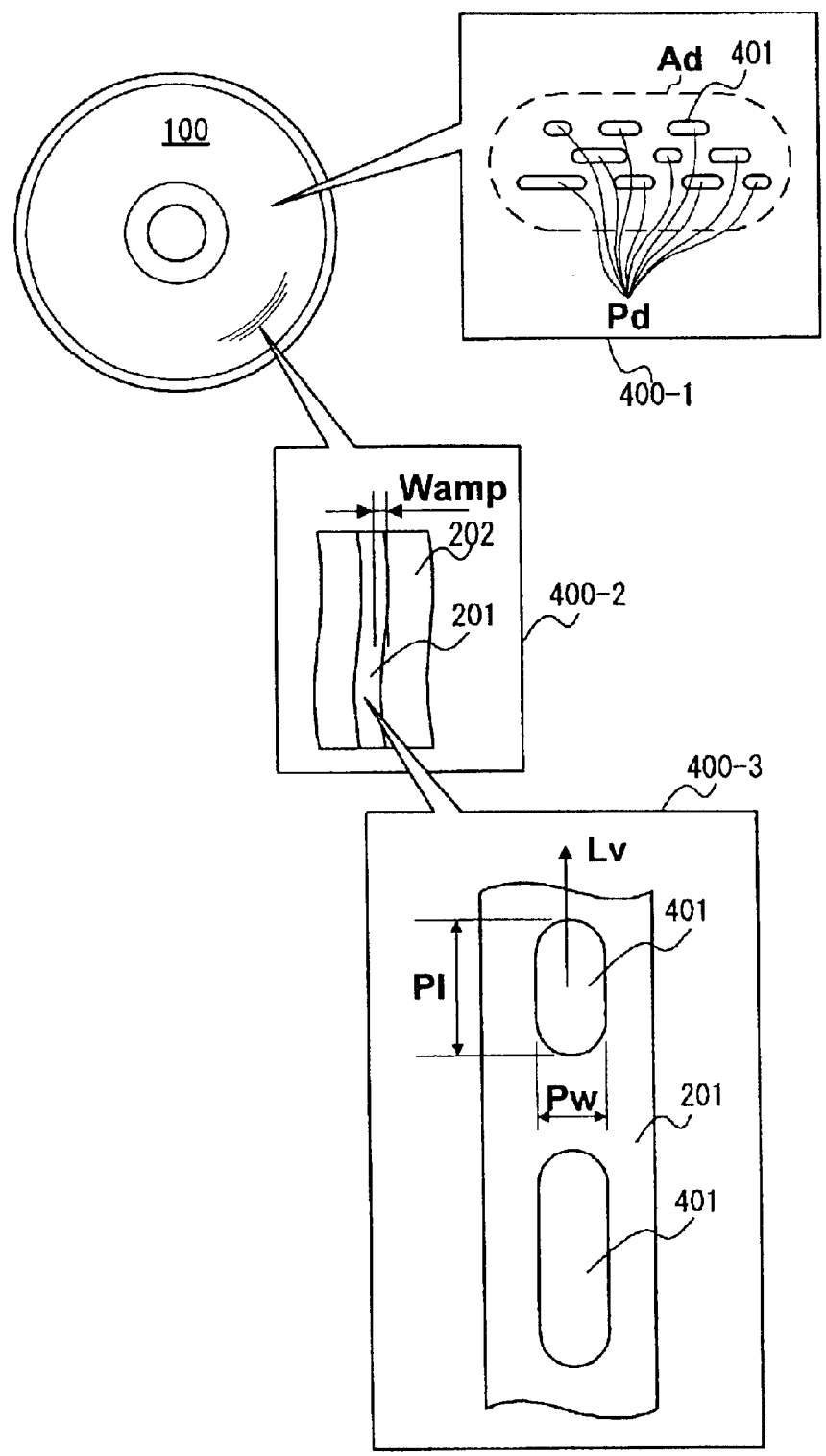
FIG. 3 is a principal enlarged sectional view relating to pit formation in the optical information recording medium shown in FIG. 1.

FIG. 1 is a partial cutaway oblique view showing the general composition of an optical information recording medium relating to the present invention; FIG. 2 is a cross sectional view of the optical information recording medium 100 used in this embodiment and shows the approximate information recording and reproducing mechanism with respect to the medium. FIG. 3 is a partial enlarged cross sectional view relating to pit formation on the optical information recording medium illustrated in FIG. 1.

In FIG. 1, the optical information recording medium 100 is constituted by forming a recording layer 102 consisting of an organic pigment film on the translucent substrate 101, by a film forming technique such as spin coating, for example, then depositing a reflective layer 103 on this recording layer 102 by means of sputtering, chemical vapour deposition (CVD), or plasma CVD, or the like, and finally forming a protective layer 104 on the reflective layer 103.

As shown in FIG. 2, spiral-shaped pre-grooves 201 are formed on the translucent substrate 101, and these spiral-shaped pre-grooves can be formed by an injection moulding method for moulding the spiral-shaped pre-grooves 201 by sputtering. The spiral-shaped pre-grooves 201 may also be formed by a technique other than sputtering.

The material of the translucent substrate 101 may be one of a variety of materials, provided that it has high transparency with respect to light of laser wavelengths used in information recording and reproduction to and from the optical information recording medium 100, and low deformation due to external pressure, environmental change, or the like, and a material such as polycarbonate, or the like, may be used for same.

Moreover, the organic pigment film forming the recording layer 102 may contain a pigment material alone, or it may also contain a prescribed amount of a stabilizer in order to increase environmental stability.

The pigment material used should have a suitable absorption coefficient and a high refractive index in the 770 nm to 830 nm wavelength region of the laser light used in recording or reproducing information to or from the optical information recording medium 100, and for example, a cyanine pigment, metallic phthalocyanine pigment, metallic azo pigment, or the like may be used, and desirably, a benezoic dicarbocyanine pigment is used as the aforementioned pigment material for the optical information recording medium 100 according to this embodiment.

The reflective layer 103 may be formed from a metallic film containing a main ingredient of Au, Ag, Cu, Pd, Al, or an alloy thereof, and a prescribed amount of another element added thereto.

Recording and reproducing information to and from the optical information recording medium 100 is performed on the basis of laser light output from a laser oscillator 303. The laser oscillator 303 is constituted in such a manner that the output power thereof can be switched between recording and reproduction, and when recording to the optical information recording medium 100, in order words, during pit formation, the laser light output from the laser oscillator 303 is switched to a high power laser light for recording.

The high power laser light for recording is reflected via a half mirror 302 and a lens 301 onto a pre-groove 201 on the optical information recording medium 100, as a laser spot of spot diameter Sd, whereby the pigment material in the recording layer 202 of high refractive index in the pre-groove 201 is destroyed locally, thus forming a pit corresponding to the recording information in the pre-groove 201.

During reproduction of information from the optical information recording medium 100, the laser light output from the laser oscillator 303 is switched to low power laser light for reproduction, and this low power laser light for reproduction is irradiated via the half mirror 302 and lens 301 onto a pre-groove 201 of the optical information recording medium 100, and the light reflected from the reflective layer 103, due to the presence or absence of a pit in the recording layer 102 is read by a detector 304 via the lens 301 and half mirror 302, thereby reproducing the information.

In this embodiment, during recording and reproduction of information, the laser light used has a wavelength λ in the range of 770 nm≦λ≦830 nm, a skew angle δ in the range of −0.6°≦δ≦0.6°, a numerical aperture NA in the range of 0.5≦NA≦0.55, and a spot diameter in the range of 1.1 μm≦Sd≦1.3 μm.

Here, if the angle of incidence of the laser light with respect to the optical information recording medium 100 is taken as θ, and the refractive index of the material through which the laser light is transmitted is taken as n, then the numerical aperture NA is given by the expression NA=n×sin θ.

Moreover, the optical information recording medium 100 according to this embodiment is able to achieve a recording capacity of 1.3 GB, in other words, approximately double that of a conventional CD-R.

In the optical information recording medium 100 according to this embodiment, in order to achieve a 1.3 GB recording capacity without changing the external diameter of a present CD-R, the track pitch Tp is set in the range of 1.0 μm≦Tp≦1.2 μm, and the pre-grooves 201 are formed on the translucent substrate 101 of the optical information recording medium 100 in such a manner that this track pitch Tp is satisfied.

Here, the track pitch Tp is determined by the interval between adjacent pre-grooves 201 as shown in FIG. 2, in other words, the distance between the respective centre positions of adjacent pre-grooves 201.

Moreover, in the optical information recording medium 100 according to the present embodiment, the linear velocity during information recording and reproducing, Lv, is set in the range of 0.77 m/s≦Lv≦0.97 m/s.

The aforementioned value is the linear velocity during information recording or reproduction at normal speed, and when recording or reproducing information at a speed factor n, the linear speed with be n times the aforementioned value.

Here, the reasons that the track pitch Tp is set in the range of 1.0 μm≦Tp≦1.2 μm, and the linear velocity Lv is set in the range of 0.77 m/s≦Lv≦0.97 m/s are that if the track pitch Tp is less than 1.0 μm, then cross talk involving the leaking of signals from adjacent tracks during reproduction will increase, and stable recording and reproducing characteristics cannot be obtained, whereas if the track pitch exceeds 1.2 μm, then the linear velocity Lv must be reduced below 0.77 m/s in order to achieve a recording capacity of 1.3 GB without changing the external dimensions, in which case, the heat energy generated when forming one pit will affect the recording state of the next pit, giving rise to thermal interference, which will in turn make it impossible to achieve stable recording and reproduction characteristics.

In other words, in the optical information recording medium 100 of the present embodiment, in order to achieve a recording capacity of 1.3 GB without changing the external diameter of a present CD-R, an optimum track pitch Tp range, and linear velocity Lv has been found, and spiral-shaped pre-grooves 201 are formed on the translucent substrate 101 on the basis of this optimum track pitch Tp range, and information is recorded and reproduced in the optimum linear velocity Lv range.

As shown by the block 400-3 in FIG. 3, when information is recorded onto the optical information recording medium 100, pits 401 are formed on the pre-groove 201. Pw indicates the pit width of the pit 401 and P1 indicates the pit length of the pit 401. Here, desirably, the smallest pit length P1 of the pits formed on the pre-grooves 201 is P1≦0.7 μm.

As shown by the block 400-2 in FIG. 3, the spiral-shaped pre-grooves 201 formed on the translucent substrate 10 are provided with a wobble of a prescribed period, and during information recording, a wobble signal is detected on the basis of the wobble of the pre-grooves 201, in such a manner that information can be recorded in accordance with absolute time information obtained on the basis of this wobble signal.

Next, the reasons for setting the spot diameter Sd to 1.1 μm≦Sd≦1.3 μm are described with reference to the results of the simulation described below.

An optical disk reproduction simulation based on optical principles was used to analyze the spot diameter Sd.

The simulation results were compared with confirmed operating conditions in an actual device, and upon confirming that a correlation between the figures had been achieved, the simulation was used to determine limit range of the spot diameter Sd due to the variation in jitter, when the linear velocity Lv, and track pitch Tp were varied.

The composition of this simulation is described below.
1) A beam output from a laser diode is focused by an object lens and irradiated onto a disk surface.
2) The irradiation point (beam spot) forms a finite Gaussian shape, and the state of interference and diffraction therein caused by the optical path difference (phase difference) of the pits and lands is calculated by approximation.
3) A diffraction image is received by a photodetector and converted to electrical voltage levels.

The pits are moved to create an eye pattern (reproduction signal).

The reproduction signal is segmented by an auto-slicer function (similar operation to a real device).

The jitter is determined from the variation in the length of the signal.
4) The jitter value varies according to the interference, cross-talk, and the like, between the pit and land codes.

Figure 4:
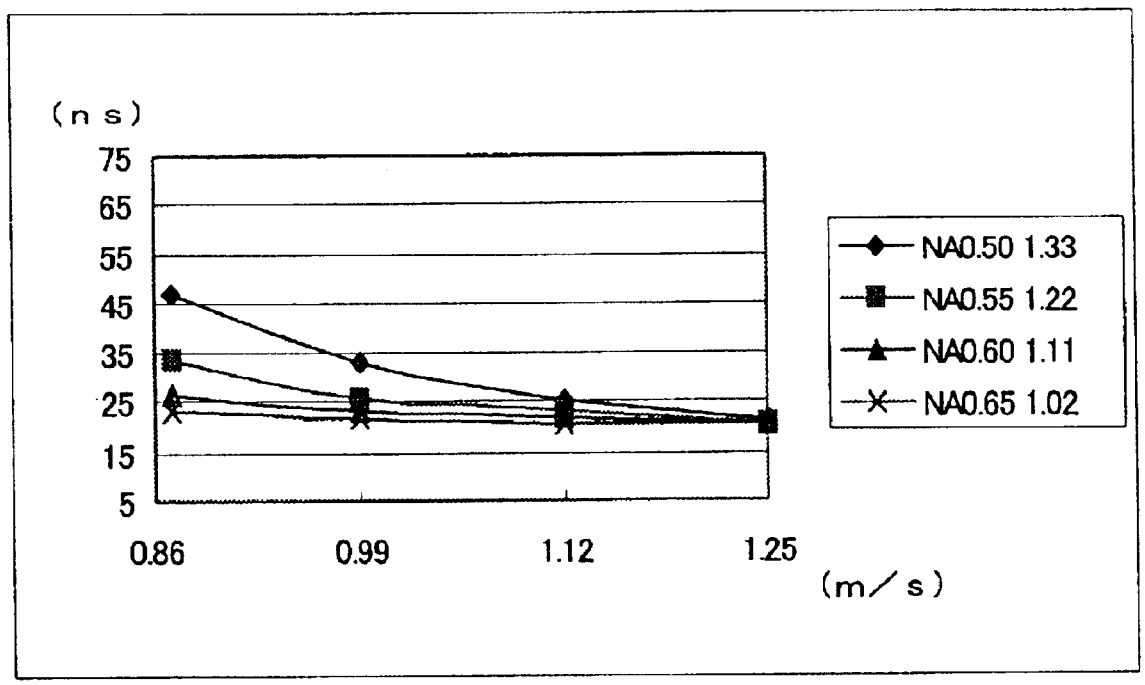
FIG. 4 is a diagram showing the relationship between linear velocity Lv and spot diameter Sd obtained from a simulation.

FIG. 4 shows the relationship between the linear velocity Lv and the spot diameter Sd obtained by the foregoing simulation. In this diagram, the horizontal axis indicates the linear velocity Lv, and the vertical axis indicates the jitter value. The characteristics described below where obtained without using a reproduction equalizer.

In evaluating the jitter value, different evaluations are required for pit jitter and land jitter, and in FIG. 4, the relationship between the linear velocity Lv and the spot diameter Sd is determined for a large land jitter value (jitter of the maximum land length).

Moreover, the graph in FIG. 4 shows variation in jitter value for different spot diameters Sd, in a case where the track pitch Tp was set to standard 1.6 μm, and the linear velocity Lv was restricted between 1.25 m/s and 0.87 m/s. In FIG. 4, spot diameter Sd values of (NA=0.50, Sd=1.33 μm), (NA=0.55, Sd=1.22 μm), (NA=0.60, Sd=1.11 μm) and (NA=0.65, Sd=1.02 μm) were used.

Here, when 35 ns (the value at which the error rate increases sharply) was set as the border line of the jitter value, it was possible to reproduce up to a linear velocity Lv of 0.87 m/s at NA=0.55, as demonstrated in FIG. 4.

Figure 5:
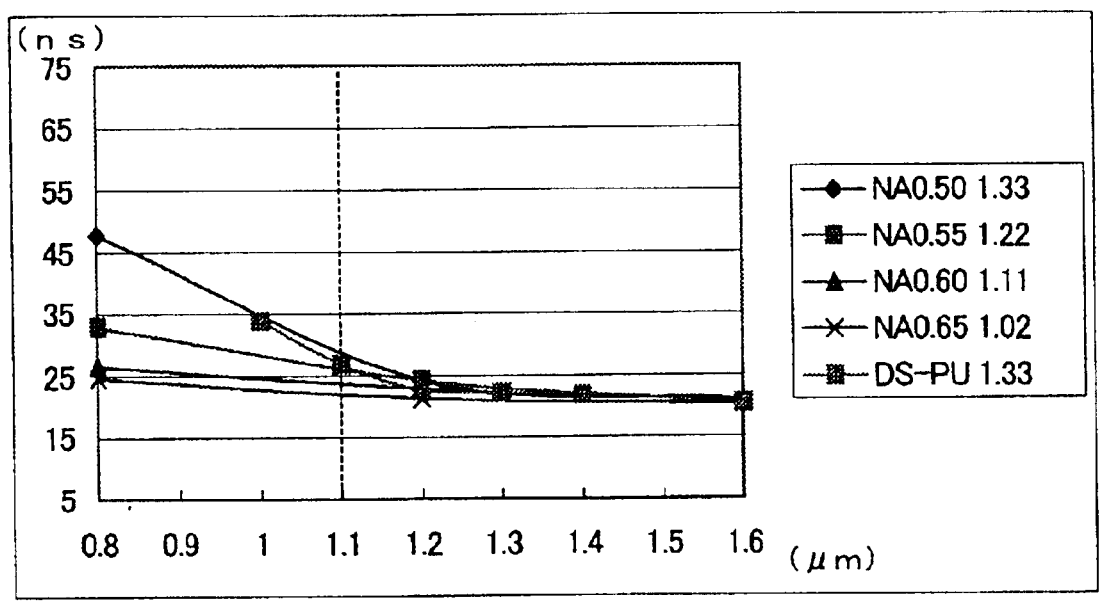
FIG. 5 is a diagram showing the relationship between a track pitch Tp and spot diameter Sd obtained from a simulation.

FIG. 5 shows the relationship between the track pitch Tp and the spot diameter Sd obtained from the foregoing simulation: the horizontal axis indicates the track pitch Tp and the vertical axis indicates the jitter value. Moreover, it shows the change in jitter value for different spot diameter Sd values, when the track pitch Tp is restricted to 1.6 μm–0.8 μm at an equivalent standard linear velocity Lv of 1.25 m/s.

In this case, in evaluating the jitter value, it is necessary to evaluate the pit jitter and land jitter separately, but here the relationship between the track pitch Tp and spot diameter Sd for a land jitter of relatively large value (jitter of maximum land length) is determined.

In FIG. 5, spot diameter Sd values of (NA=0.50, Sd=1.33 μm), (NA=0.55, Sd=1.22 μm), (NA=0.60, Sd=1.11 μm), (NA=0.65, Sd=1.02 μm) and DS-PU, Sd=1.33 μm) were used.

Here, if the border line of the jitter value is taken as 35 ns, then as demonstrated by FIG. 5, a track pitch Tp of less than 1.0 μm is not possible at NA=0.50, and therefore it is considered that reproduction is possible if the numerical aperture is in the region of NA=0.50 (spot diameter Sd: 1.33 μm).

Figure 6:
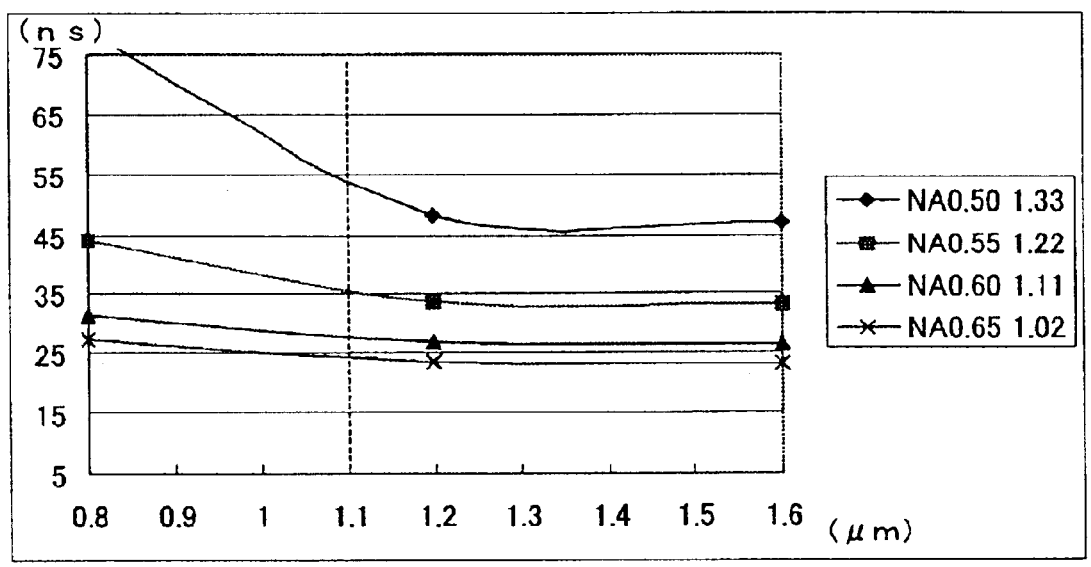
FIG. 6 is a diagram showing the relationship between track pitch Tp and spot diameter Sd obtained from a simulation when the linear velocity Lv is set to 0.87 m/s.

Moreover, FIG. 6 shows the relationship between track pitch Tp and spot diameter Sd obtained by the foregoing simulation when the linear velocity Lv was set to 0.87 m/s.

In other words, FIG. 6 shows the variation in the jitter value for different spot diameter Sd values, when the linear velocity is set to 0.87 m/s (double-density conditions) and the track pitch Tp is restricted to a range of 1.6 μm to 0.8 m.

In FIG. 6, spot diameter Sd values of (NA=0.50, Sd=1.33 μm), (NA=0.55, Sd=1.22 μm), (NA=0.60, Sd=1.11 μm), and (NA=0.65, Sd=1.02 μm) were used. Moreover, in this case also, different jitter evaluations are required for the bit jitter and land jitter, respectively, but here, the relationship between the track pitch Tp and spot diameter Sd was found for a large land jitter value (jitter of the maximum land length). Moreover, in FIG. 6, the horizontal axis indicates the track pitch Tp, and the vertical axis indicates the jitter value.

Here, if the border line of the jitter value is taken as 35 ns, then as shown in FIG. 6, reproduction will just be possible at NA=0.55 (spot diameter Sd: 1.22 µm), when the track pitch Tp is 1.1 µm.

Therefore, it was judged that a spot diameter of 1.22 µm or less was required. However, it is supposed that by using a reproduction equalizer, reproduction would be possible up to a spot diameter Sd of 1.3 µm.

Next, the reasons for selecting a spot diameter Sd of 1.1 µm or above are described.

Figure 7:
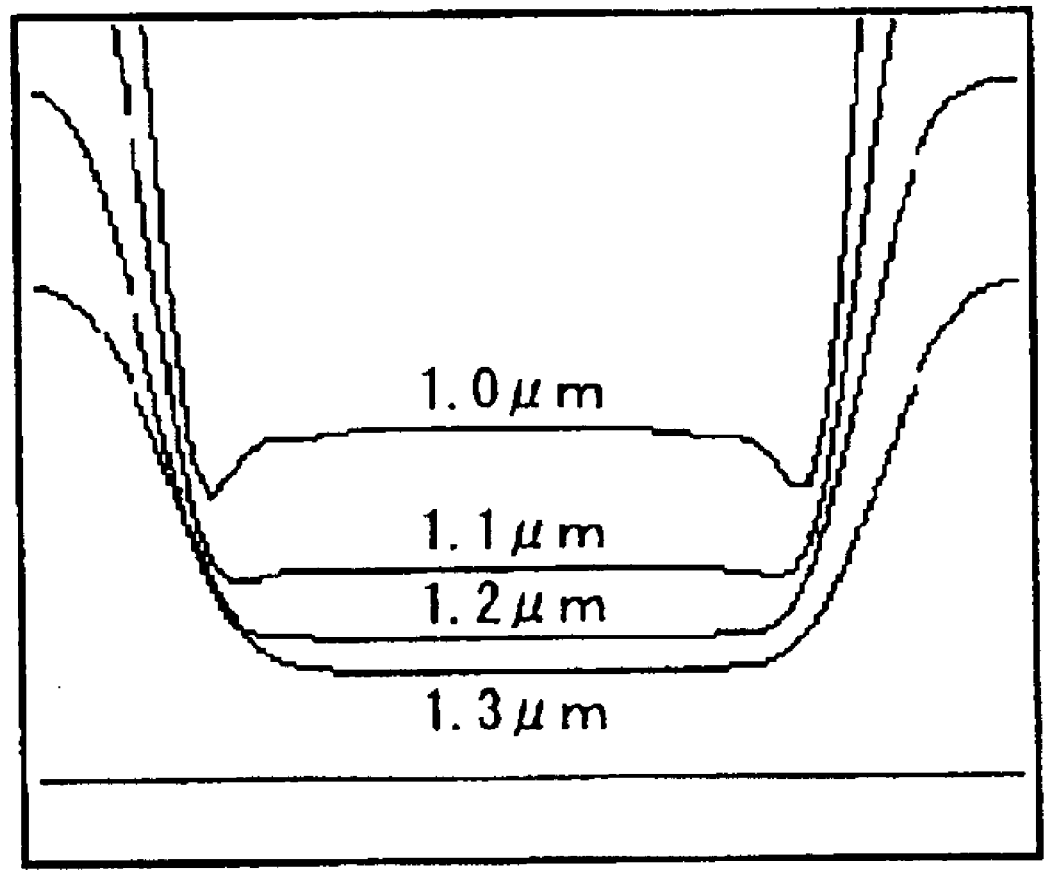
FIG. 7 is a diagram showing the change in RF signal waveform with change in the spot diameter Sd.

FIG. 7 shows the change in the RF signal waveform with change in the spot diameter Sd. Here, the conditions of this change in the RF signal waveform are a linear velocity of 1.25 m/s in the case of general CD pits.

Usually, when the spot diameter Sd becomes too much smaller than the pits, a satisfactory optical phase difference cannot be obtained and distortion occurs in the waveform. Information is obtained from the reproduction signal by identifying the signal length by means of an auto-slicer, but if the waveform is distorted, then this causes adverse effects on the read-out of information. If the RF waveform distortion exceeds the slice level, then satisfactory readout cannot be performed.

Consequently, it is important that no waveform distortion occurs, and in the present case, this requires a spot diameter Sd of 1.1 µm or greater. In other words, if the spot diameter Sd is 1.0 µm, the waveform distortion will be unacceptably high. In the foregoing simulation results, this jitter does not appear, but if fluctuation in the pit width is taken into account, then an Sd value of 1.1 µm or above is required.

To describe the causes of the aforementioned waveform distortion, in an optical recording medium of this type, a finite laser light spot is irradiated onto pit and land sections, and the interference generated by the optical phase differential caused by the different optical depths of the pit and land sections creates brightness and darkness, information being identified according to this differential in optical intensity, but if the difference in the surface area occupied by the pit and the land within the spot diameter becomes too large, then the overall phase difference will diminish, leading to insufficient generation of interference and consequently, problems in identifying the information.

Embodiment

Under the following conditions of the recording and reproducing device:

1) Spot diameter=1.23 µm (Tan direction=1.20 µm, Rad direction=1.26 µm)
2) NA=0.55
3) Linear velocity=0.9 m/s when an optical information recording medium having a track pitch Tp=1.1 µm was recorded with laser light of 782 nm wavelength and 0° angle of incidence, without using an equalizer, the RF jitter of the minimum land length (L3T) was 33.7 ns, and the RF jitter of the minimum pit length (P3T) was 34.5 ns.

Moreover, when an equalizer was used, the RF jitter of the minimum land length (L3T) was 18.5 ns, and the RF jitter of the minimum pit length (P3T) was 18.1 ns.

From these results, it is evident that, in either case, the RF jitter characteristics are satisfied and good recording characteristics can be obtained.

FIG. 8 is a block diagram showing the approximate composition of an optical disk recording and reproducing device for performing recording and reproduction to and from an optical information recording medium 100 relating to the present invention.

In FIG. 8, the optical information recording medium (hereinafter, called "disk") 100 inserted via a disk insertion opening (not illustrated) is rotated by a spindle motor 11, and information is recorded or reproduced to or from the disk 100 by means of an optical pickup 13.

Here, the rotational speed of the disk 10, in other words, the rotational speed of the spindle motor 11 is detected by a frequency signal generator (FG) 12, and the spindle motor 11 is controlled via a motor driver 14.

The optical pickup 13 has a focus control function and tracking control function, and the focus control function of the optical pickup 13 is controlled by a focus control circuit 20, whilst the tracking control function is controlled by a tracking control circuit 21.

The optical pickup 13 is constituted movably in the radial direction of the disk 10, by means of a feed motor, which is controlled by a feed control device 22 via a motor driver 16.

Moreover, the optical disk reproducing device according to this embodiment comprises a CLV control circuit 23 for controlling the rotation of the disk 10 at a uniform linear velocity, and a CAV control circuit 24 for controlling the rotating of the disk 10 at a uniform angular velocity.

Switching is performed in the motor driver 14 to determine whether the rotation of the spindle motor 11 is controlled to a uniform linear velocity by the CLV control circuit 23 or to a uniform angular velocity by the CAV control circuit 24, and this switching is controlled by the controller 25.

In other words, when the optical disk reproduction device is started, firstly, the motor driver 14 is switched by the controller 25 in such a manner that the spindle motor 11 is controlled to rotate at a uniform angular speed by means of the CAV control circuit 24, whereupon the motor driver 14 is switched in such a manner that the spindle motor 11 is controlled to rotate at a uniform linear velocity by means of the CLV control circuit 23.

When recording information in the optical disk recording and reproducing device, a recording signal is supplied to the optical pickup 13 via a signal processing circuit 19 and head amp 18, and the information is recorded by forming pits corresponding to the recording signal on the recording layer 102 of the disk 10 by means of recording laser light output by the optical pickup 13.

In this case, a focus error signal FE and tracking error signal TE are included in the signal read out from the disk 10, and the head amp 18 supplies the focus error signal FE to the focus control circuit 20, which controls the focus control function of the optical pickup 13, and moreover, the tracking control circuit 21 is controlled on the basis of the tracking error signal TE, thereby controlling the tracking control function of the optical pickup 13, whilst the position of the optical pickup 13 in the radial direction of the disk 10 is controlled in conjunction with the feed control circuit 22.

In this case, the controller 25 detects a wobble signal on the basis of the tracking error signal TE output by the head amp 18, absolute time information AT forming recording position data is reproduced on the basis of this wobble signal and supplied to the CLV control circuit 23, and the disk 10 is controlled to rotate at a uniform linear velocity. The linear velocity Lv in this case is controlled to a range of 0.77 m/s≦Lv≦0.97 m/s.

In other words, in the optical information recording medium 100 according to this embodiment, the pre-grooves 201 are provided with a wobble in such a manner that the linear velocity Lv during recording is restricted to a range of 0.77 m/s≦Lv≦0.97 m/s, and recording of information onto the optical information recording medium 100 is performed at a linear velocity Lv range of 0.77 m/s≦Lv≦0.97 m/s.

Moreover, during reproduction of information in this optical disk recording and reproducing device, a signal read from the disk 10 by the optical pickup 13 is supplied via the head amp 18 to the signal processing circuit 19.

Here, the signal read out from the disk 10 by the optical pickup 13 includes a focus error signal FE, tracking error signal TE, EFM (Eight Fourteen Modulation) signal, CIRC (Cross Interleave Reed-Solomon Code), subsidiary codes, and the like, and the head amp 18 supplies the focus error signal FE to the focus control circuit 20, thereby controlling the focus control function of the optical pickup 13, the tracking control circuit 21 is controlled on the basis of the tracking error signal TE, thereby controlling the tracking control function of the optical pickup 13, and furthermore, the position of the optical pickup 13 in the radial direction is controlled in conjunction with the feed control circuit 22.

In the signal processing circuit 19, the EFM signal in the information read from the disk 10 is error corrected and demodulated using a CIRC, and is then output as a reproduction signal.

Moreover, the signal processing circuit 19 reproduces and outputs absolute time information AT forming recording position data on the basis of the EFM signal in the information read from the disk 10, and supplies this information to the CLV control circuit 23, which controls the disk 10 to rotate at a uniform linear velocity.

In this case, if the linear velocity Lv during recording is set in the range of 0.77 m/s≦Lv≦0.97 m/s, then the linear velocity Lv is controlled to the range of 0.77 m/s≦Lv≦0.97 m/s when the information is reproduced.

INDUSTRIAL APPLICABILITY

The present invention provides a recording and reproducing method and device for an optical information recording medium, and an optical pickup for same, whereby high-density recording and high-speed recording can be achieved.

According to this invention, it is possible to achieve approximately double the recording capacity of a current CD-R, thereby obtaining compatibility with the increasing capacity required in response to year on year increases in data processing volumes.

What is claimed is:

1. A recording and reproducing method for an optical information recording medium comprising a recording layer provided on a translucent substrate formed with spiral-shaped pre-grooves, wherein recording or reproduction of information to or from the optical information recording medium is performed using laser light having a wavelength λ of 770 nm≦λ≦830 nm and a spot diameter Sd of 1.1 μm≦Sd≦1.3 μm, and is performed by scanning a spot of the laser light at a uniform linear velocity Lv onto the optical information recording medium, the linear velocity Lv being 0.77 m/s≦Lv≦0.97 m/s at normal speed.

2. A recording and reproducing method for an optical information recording medium comprising a recording layer provided on a translucent substrate formed with spiral-shaped pre-grooves, wherein recording or reproduction of information to or from the optical information recording medium is performed using laser light having a wavelength λ of 770 nm≦λ≦830 nm and a spot diameter Sd of 1.1 μm≦Sd≦1.3 μm, and the irradiation of the laser light onto the optical information recording medium is performed by means of an optical system having a numerical aperture NA of 0.5≦NA≦0.55, and a skew angle δ of −0.6°≦δ≦0.6°.

3. The recording and reproducing method for an optical information recording medium according to claim 1, wherein the pre-grooves have a track pitch Tp of 1.0 μm≦Tp≦1.2 μm.

4. A recording and reproducing device for an optical information recording medium comprising a recording layer provided on a translucent substrate formed with spiral-shaped pre-grooves, characterized in comprising:

an optical pickup for irradiating laser light having a wavelength λ of 770 nm≦λ≦830 nm, and a spot diameter Sd of 1.1 μm≦Sd≦1.3 μm, onto the optical information recording medium, and detecting reflected light from the optical information recording medium; and control means for scanning laser light irradiated by the optical pickup at a uniform linear velocity over the pre-grooves of the optical information recording medium, and controlling the linear velocity Lv to 0.77 m/s≦Lv≦0.97 m/s, when recording or reproducing at normal speed.

5. The recording and reproducing method for an optical information recording medium according to claim 2, wherein the pre-grooves have a track pitch Tp of 1.0 μm≦Tp≦1.2 μm.

* * * * *